United States Patent
Ivanyi

(10) Patent No.: US 6,286,140 B1
(45) Date of Patent: *Sep. 4, 2001

(54) SYSTEM AND METHOD FOR MEASURING AND STORING INFORMATION PERTAINING TO TELEVISION VIEWER OR USER BEHAVIOR

(76) Inventor: Thomas P. Ivanyi, 50 Rockefeller Plz., New York, NY (US) 10020

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/975,374

(22) Filed: Nov. 20, 1997

(51) Int. Cl.[7] .................................................. H04N 7/00
(52) U.S. Cl. ................................................ 725/14; 725/35
(58) Field of Search ................................ 348/2, 6, 7, 10, 348/12, 13, 1; 455/2, 4.2, 5.1; 725/9, 14, 16, 29, 35

(56) References Cited

U.S. PATENT DOCUMENTS

| | | | |
|---|---|---|---|
| 4,025,851 | * 5/1977 | Haselwood et al. | 325/31 |
| 4,484,217 | 11/1984 | Block . | |
| 4,566,030 | * 1/1986 | Nickerson et al. | 358/84 |
| 4,567,511 | 1/1986 | Smith et al. . | |
| 4,578,700 | 3/1986 | Roberts et al. . | |
| 4,584,602 | 4/1986 | Nakagawa . | |
| 4,599,644 | 7/1986 | Fischer . | |
| 4,658,290 | * 4/1987 | McKenna et al. | 358/84 |
| 4,816,904 | * 3/1989 | McKenna et al. | 358/84 |
| 4,885,632 | * 12/1989 | Mabey et al. | 358/84 |
| 4,912,552 | * 3/1990 | Allison, III et al. | 358/84 |
| 4,926,255 | 5/1990 | Von Kohorn . | |
| 4,930,011 | * 5/1990 | Kiewit | 358/84 |
| 5,014,125 | 5/1991 | Pocock et al. . | |
| 5,023,929 | 6/1991 | Call . | |
| 5,046,093 | 9/1991 | Wachob . | |
| 5,075,771 | 12/1991 | Hashimoto . | |
| 5,101,267 | * 3/1992 | Morales-Garza | 358/84 |
| 5,155,591 | 10/1992 | Wachob . | |
| 5,251,324 | * 10/1993 | McMullan, Jr. | 455/2 |
| 5,371,550 | 12/1994 | Shibutani et al. . | |
| 5,374,951 | * 12/1994 | Welsh | 348/4 |
| 5,375,160 | 12/1994 | Guidon et al. . | |
| 5,382,970 | 1/1995 | Kiefl . | |

(List continued on next page.)

OTHER PUBLICATIONS

Lin et al "Automated television scheduling via evolving agents", IEEE 1997, pp. 691–696.*

Primary Examiner—Thomas Black
Assistant Examiner—Uyen Le
(74) Attorney, Agent, or Firm—Greenberg Traurig, LLP

(57) ABSTRACT

A system for monitoring television viewer behavior, which comprises a signal receiving device, wherein said signal receiving device further comprises a monitoring device, for monitoring an occurrence of an event, wherein the event comprises a change of at least one of on/off status of said signal receiving device, a channel change, a volume change, a mute/unmute operation and a user interactive or non-interactive event or operation. The monitoring device generates a digital signal representative of at least one of on/off status of the signal receiving device, channel change, volume change, mute/unmute operation, and user interactive or non-interactive one of event and operation. The signal receiving device also comprises an event timing device for keeping a real-time record of event time occurrence and for generating a digital signal representative of event time occurrence. The signal receiving device also comprises a data latching device for one of latching and storing the digital signals generated by said monitoring device and said event timing device. The signal receiving device also comprises a database for storing the data latched or stored by said data latching device.

28 Claims, 6 Drawing Sheets

U.S. PATENT DOCUMENTS

| | | | |
|---|---|---|---|
| 5,438,355 | * | 8/1995 | Palmer ................................ 348/1 |
| 5,444,499 | * | 8/1995 | Saitoh ............................... 348/734 |
| 5,497,185 | | 3/1996 | Dufresne et al. . |
| 5,500,681 | | 3/1996 | Jones . |
| 5,512,933 | | 4/1996 | Wheatley et al. . |
| 5,550,928 | * | 8/1996 | Lu et al. ........................... 382/116 |
| 5,561,708 | * | 10/1996 | Remillard ............................ 379/96 |
| 5,585,865 | | 12/1996 | Amano et al. . |
| 5,592,551 | * | 1/1997 | Lett et al. ........................... 380/20 |
| 5,600,364 | * | 2/1997 | Hendricks et al. ................... 348/1 |
| 5,608,445 | | 3/1997 | Mischler . |
| 5,631,743 | | 5/1997 | Inoue . |
| 5,635,978 | | 6/1997 | Alten et al. . |
| 5,703,795 | * | 12/1997 | Mankovitz ......................... 364/514 R |
| 5,734,720 | * | 3/1998 | Salganicoff ......................... 380/20 |
| 5,758,257 | * | 5/1998 | Herz et al. ........................... 455/2 |
| 5,862,339 | * | 1/1999 | Bonnaure et al. ............. 395/200.57 |
| 5,945,988 | * | 8/1999 | Williams et al. .................... 345/327 |

\* cited by examiner

SYSTEM AND METHOD FOR MEASURING AND STORING INFORMATION PERTAINING TO TELEVISION VIEWER OR USER BEHAVIOR

FIELD OF THE INVENTION

The present invention pertains to a system and a method for monitoring and storing information pertaining to television viewer or user behavior and, in particular, to a system and a method for monitoring viewer or user behavior and responses to televised programs, advertising commercials and services.

BACKGROUND OF THE INVENTION

Television viewership information and viewer behavioral characteristics and information are important factors and criteria for determining the costs and effectiveness of television programs and advertising commercials. Television viewership is currently tracked by various means, most notable of which is the Nielsen rating system which measures rankings by households. These rankings have come to be commonly known as "Ratings". A "Share" represents the percentage of television sets in use.

The demographics which are utilized by Nielsen consist of adults from the 18–49 age group. This age group is one of the most sought after by advertisers.

The Nielsen rating system, however, has come under criticism from industry sources questioning its accuracy and effectiveness of demographic targeting for purposes of determining advertising revenues. Further, existing market research services and measurement procedures can, at best, be characterized as being inadequate for capturing accurate and detailed viewer patterns. As a result of hardware limitations and the communication constraints associated therewith, it has been difficult to incorporate the features of real-time monitoring systems into systems which attempt to formulate behavioral patterns and histories. Most of the systems which have been designed in the past, with this objective in mind, have tended to be application specific and have required customization.

Prior art systems have also been characterized by the lack of sample information, sample size, biases in selecting marketing research samples and errors in data interpretation.

SUMMARY OF THE PRESENT INVENTION

The present invention provides a system and a method which overcomes shortcomings of the prior art viewer tracking devices, techniques and methods.

The present invention is directed to a television viewer or user monitoring system and method which monitors television viewer or user (hereinafter collectively referred to as "viewer") behavior and behavior patterns. The system comprises a signal receiving device which receives television signal broadcasts. The television signals are broadcast by a television station transmitter. The television signals are transmitted to the signal receiving device via an appropriate communication system.

The system also comprises a control device which may be a remote control device for providing control over the signal receiving device. The control device provides the means by which a television viewer may control the operation of the signal receiving device so as to turn the signal receiving device on or off, to change channels, to increase or decrease the volume level and/or to MUTE or UNMUTE the sound on the television as well as the viewer's ability to enter data into the system on an interactive basis.

The system also comprises a television for user viewing. The signal receiving device is connected to the television so as to transmit or relay the television signals thereto.

The system of the present invention will operate in conjunction with a plurality of signal receiving devices, and associated televisions and remote control devices, for a multitude of television viewers.

The signal receiving device comprises a central processing unit (CPU) which serves to provide control over the signal receiving device. The signal receiving device also comprises a random access memory (RAM) device and a read only memory (ROM) device which are connected with the CPU. The signal receiving device also comprises a receiver, for receiving broadcast signals from a broadcasting station, television station, or service provider, and a transmitter, for transmitting signals to the broadcasting station, or service provider. The receiver and the transmitter are connected to the CPU. The signal receiving device also comprises a transmitter, for relaying the received television signals to the television, which transmitter is also connected to the CPU.

The signal receiving device also comprises an input device, for enabling a user to enter commands into the signal receiving device such as, for example, to turn the device on or off, to change channels, to adjust volume and/or to MUTE or UNMUTE the sound. The input device is also connected to the CPU. The signal receiving device also comprises an output device which provides a visual indication of the state of operation of the signal receiving device. The output device is also connected to the CPU.

The signal receiving device also comprises a polling signal receiver which is connected to the CPU and which receives signals which are transmitted to the signal receiving device from the central processing computer. The signal receiving device also comprises a polling signal transmitter which is connected to the CPU and which transmits data and/or information from the signal receiving device to the central processing computer. As will be described in more detail hereinbelow, the data and/or information which is transmitted from the signal receiving device is the data and/or information indicative of and/or reflecting viewer behavior.

The signal receiving device also comprises a remote control receiver which receives signals which are transmitted to the signal receiving device from the remote control device. The remote control receiver is also connected to the CPU.

The signal receiving device also comprises a plurality of monitoring devices which serve to monitor various operational states of the signal receiving device. These monitoring devices comprise an ON/OFF monitoring device, which monitors the ON/OFF state of the signal receiving device and generates a digital signal representative of this operational state; a CHANNEL monitoring device, which monitors the television or broadcast channel or frequency being viewed by the television viewer and which generates a digital signal representative of the channel being viewed; a MUTE or UNMUTE monitoring device, which monitors the occurrence of a MUTE or UNMUTE operational state and which generates a digital signal representative of a MUTE or UNMUTE state; and a VOLUME CHANGE monitoring device which will monitor decreases and increases in volume and volume level. Each of the above described monitoring devices are connected to the CPU.

The signal receiving device also comprises a real-time event clock for maintaining accurate real-time event time keeping and time measurements. The event clock is connected to the CPU. The signal receiving device also comprises a data latching device which is connected to the CPU and to each of the ON/OFF monitoring device, the CHANNEL monitoring device, the MUTE/UNMUTE monitoring device and the VOLUME CHANGE monitoring device as well as the real-time event clock.

Monitoring devices may also be utilized for monitoring the utilization of functions such as "SELECT" and "DISPLAY" as well as other viewer selectable functions such as those related to events related to on-line and interactive services and products as well as recreational activities and games.

Upon the occurrence of a pre-specified event, such as the turning of the signal receiving device on or off, the changing of a television channel, the changing of volume level and/or the MUTING and UNMUTING of sound, the data from each of the monitoring devices, as well as the time measured by the real-time event clock, will be read by, and stored within, the data latching device in order to provide a time-stamped operational state of the signal receiving device.

A data structure is utilized which contains the data representative of the time-stamped data obtained from the monitoring devices. The data structure consists of a bit data stream in which pre-assigned bits store the time stamp data, on/off data, channel data, MUTE/UNMUTE data, volume data and user identification data. Other bits may be utilized to store other appropriate data as specified by the system.

The states of each of the monitoring devices are continuously monitored with their respective states represented in a digital signal fashion. When a change of operational state occurs, whether by viewer activation of the input device or the remote control device, the CPU will activate the data latching device. The data latching device will read the signals present at each of the monitoring devices, as well as the time from the real-time event clock, so as to obtain a time-stamped digital signal representative of the post-event operational state of signal receiving device.

The signal receiving device also comprises a memory storage device or database for storing raw data and/or information, and/or any other data or information necessary for system operation, which is received by the data latching device.

The system also comprises a central processing computer which is located at a central location. The central processing computer transmits signals to, and receives data and/or information from, the signal receiving device and will perform various processing routines in conjunction with the received data and/or information.

The central processing computer, which collects data from any number of signal receiving devices, is utilized for collecting and processing the data and/or information in conjunction with program and advertising commercial content and correlated time data.

The central processing computer comprises a central processing unit (central CPU) which serves to provide control over the central processing computer. The central processing computer also comprises a random access memory (RAM) device and a read only memory (ROM) device which are connected to the central CPU. The central processing computer also comprises a receiver, for receiving signals which contain data and/or information from the signal receiving device, and a transmitter, for transmitting signals to the signal receiving device. The receiver and the transmitter are connected to the central CPU. As will be described in more detail hereinbelow, the data and/or information which is received from the signal receiving device will include the aforementioned time-stamped data indicative of and/or reflecting the operational state of the signal receiving device.

The central processing computer also comprises an input device, for enabling a user to enter data and/or commands into the central processing computer. The input device is also connected to the central CPU. The central processing computer also comprises an output device which provides a visual indication of the state of operation of the central processing computer. The output device is also connected to the central CPU.

The central processing computer also comprises a polling signal transmitter which is connected to the central CPU and which transmits polling signals to the signal receiving device and, in particular, to the polling signal receiver. The central processing computer also comprises a polling signal receiver which is connected to the central CPU and which receives polling signals from the signal receiving device and, in particular, from the polling signal transmitter.

The central processing computer also comprises a memory storage device or database for storing data and/or information, including raw data and/or information, as well as other data and/or information, which is received from the signal receiving device. The database may contain information regarding viewers, subscribers and demographics which may be obtained and stored with the viewers or subscribers permission.

The system and method of the present invention serves to monitor television viewer behavior and/or patterns by recording data and/or information which is reflects viewer events, which include on/off operation of the signal receiving device, the changing of channels, the muting or unmuting of volume, the changing of volume, as well as any other event-defined activities which may occur at the viewer's direction, including interactive and non-interactive events.

The data and/or information, which is initially stored in the signal receiver device, can be transmitted, at various times, to the central processing computer. The central processing computer may then process the data and/or information, in any one of a number of ways in order to obtain statistical and/or other information which may be utilized in order to describe or gauge viewer behavior. This data and/or information may also provide statistical information for a large group of viewers.

The processed data and/or information may be continuously or periodically processed and updated, in conjunction with detailed information and/or listings corresponding to programming and advertising commercials.

Accordingly, it is an object of the present invention to provide a system and a method for monitoring and storing information pertaining to television viewer or user behavior.

It is another object of the present invention to provide a system and method for monitoring television viewer or user behavior with regards to, and in response to, televised programs and commercial advertisements.

It is yet another object of the present invention to provide a system and a method for monitoring and storing information pertaining to a television viewer's or user's actions in controlling and/or changing settings and/or controls for various functions on a television or signal receiving device.

It is yet another object of the present invention to provide a system and a method for monitoring and storing information pertaining to a television viewer's or user's actions in controlling and/or changing settings and/or controls for various functions on a television or signal receiving device and which can be correlated to events by means of event time-stamped data and/or information.

Other objects and advantages of the present invention will be apparent to those skilled in the art upon a review of the Description of the Preferred Embodiment taken in conjunction with the Drawings which follow.

DESCRIPTION OF THE PREFERRED EMBODIMENT

In a preferred embodiment, the present invention to directed to a system and a method for monitoring the activities of the public by monitoring the activities of a significant or sufficient sample of television viewers or users. The present invention provides a system and a method for monitoring viewer or user activities in viewing or using a television, such as, for example, monitoring when the viewer or user changes viewing channels, changes the volume, mutes or unmutes the sound, turns a signal receiving device on or off, or performs any other activity or function related to the viewing or use of a television.

The present invention can record any one or more of the above-described activities as well as the time at which it or they occurred and utilize this information with defined schedules or data so as to determine viewer or user behavior.

For example, the present invention may monitor when a viewer changes channels, note that such change occurred at the time a program or commercial aired and correlate the time of the change of channel with the program or commercial so as to draw conclusions as to viewer response to the program or commercial.

Figure 1:
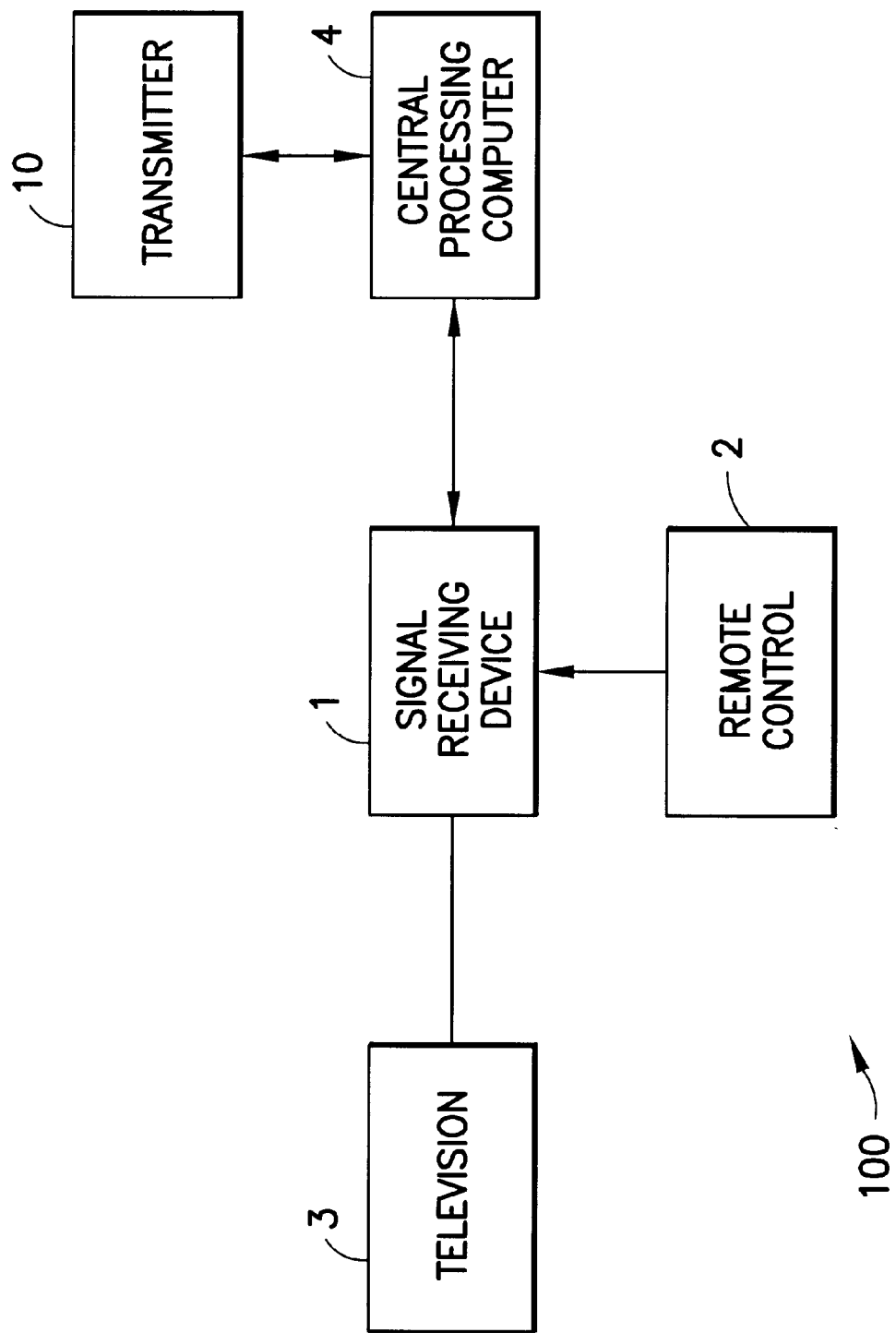
FIG. 1 illustrates the system of the present invention in block diagram form.

FIG. 1 illustrates a preferred embodiment of the system of the present invention which is designated generally by the reference numeral 100. The present invention is directed to a television viewer or user monitoring system and method which monitors television viewer or user behavior and behavior patterns. The system 100 comprises a signal receiving device 1 which receives television signal broadcasts. The television signals are broadcast by a television station or signal transmitter 10. The television signals, in the preferred embodiment, are transmitted to the signal receiving device 1 via a cable television communication system which may include a hard-wired or a wireless system or medium. In this regard, the television signals may be transmitted over conventional wired cable systems and/or via satellite transmission systems and/or any combination thereof. It is important to note that the communication system utilized in conjunction with the present invention can also include any suitable signal transmission devices and mediums, including telephone communication devices and systems, fiber optic communication devices and systems and other communication devices and systems which are known to those skilled in the art.

The system 100 also comprises a control device 2 which, in the preferred embodiment, is a remote control device for providing control over the signal receiving device 1. The control device 2 provides the means by which a television viewer may control the operation of the signal receiving device 1 so as to turn the signal receiving device on or off, to change channels, to increase or decrease the volume level and/or to MUTE or UNMUTE the sound on the television as well as the viewer's ability to enter data into the system on an interactive and/or non-interactive basis so as to facilitate the use of the services and/or products provided over the communication system. This further facilitates the use of the present invention to monitor events related to on-line and interactive services and products as well as recreational activities and games. The system 100 also comprises a television 3 for user viewing. The signal receiving device 1 is connected to the television 3 so as to transmit or relay the television signals thereto.

Although a single signal receiving device 1, along with an associated television 3 and a remote control 2, are depicted in FIG. 1, it is important to note that the system of the present invention, in the preferred embodiment, will operate in conjunction with a plurality of signal receiving devices, and associated televisions and remote control devices, for a multitude of television viewers.

The system 100 also comprises a central processing computer 4 which is located at a central location. The central processing computer 4 will transmit signals to, and receive data and/or information from, the signal receiving device 1 and will perform various processing routines in conjunction with the received data and/or information.

Figure 2:
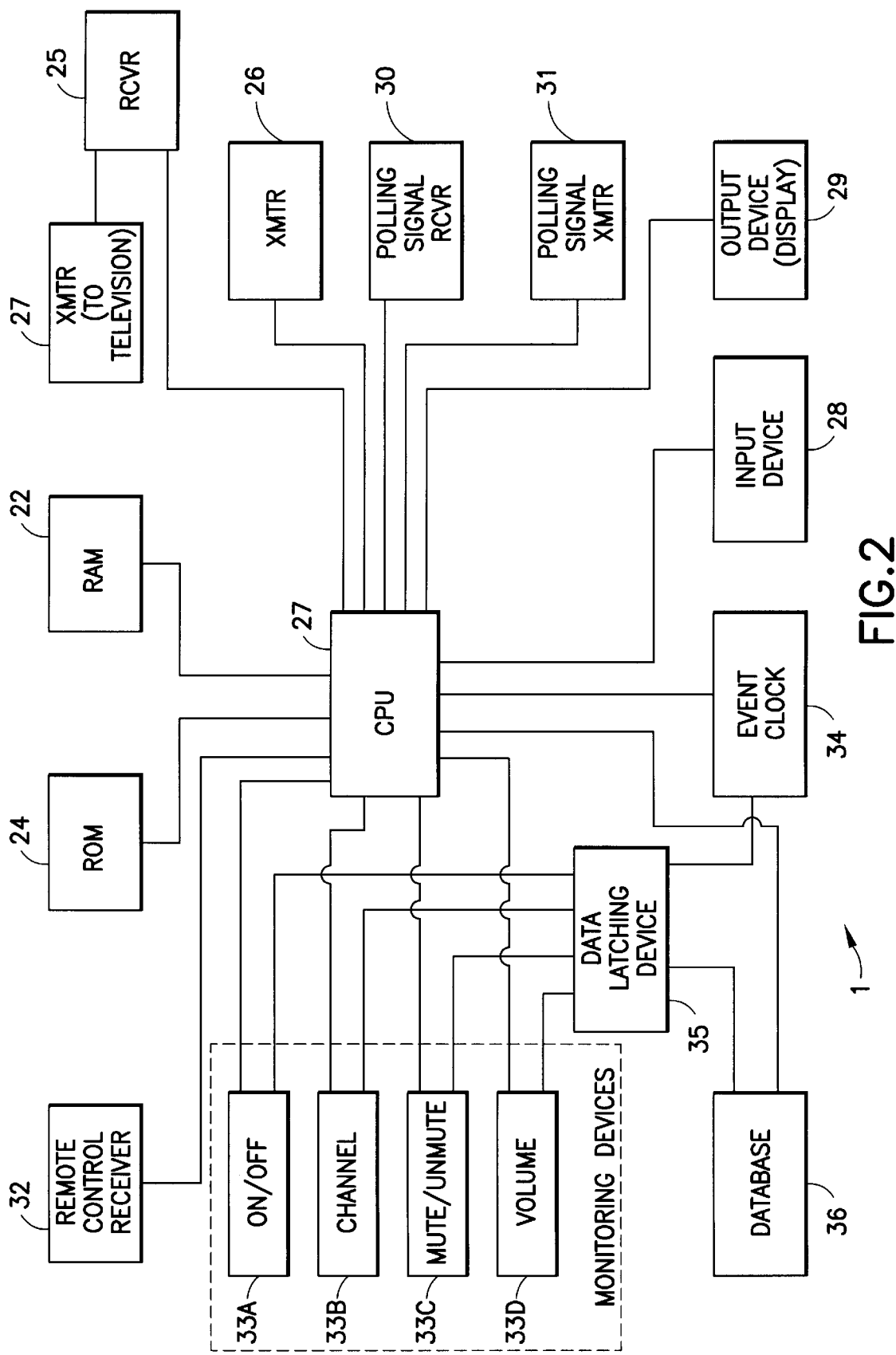
FIG. 2 illustrates the signal receiving device of the system of FIG. 1 in block diagram form.

FIG. 2 illustrates the main components of the signal receiving device 1 of FIG. 1 in block diagram form. In FIG. 2, the signal receiving device comprises a central processing unit (CPU) 21 which serves to provide control over the signal receiving device 1. The signal receiving device 1 also comprises a random access memory (RAM) device 22 and a read only memory (ROM) device 24 which are connected to the CPU 21. The signal receiver device 1 also comprises a receiver 25, for receiving broadcast signals from a broadcasting station or service provider, and a transmitter 26, for transmitting signals to the broadcasting station, television station, or service provider. The receiver 25 and the transmitter 26 are connected to the CPU 21. The signal receiving device 1 also comprises a transmitter 27, for relaying the received television signals to the television 3, which transmitter is also connected to the CPU 21.

The signal receiving device 1 also comprises an input device 28, for enabling a user to enter commands into the signal receiving device such as, for example, to turn the device on or off, to change channels, to adjust volume and/or to MUTE or UNMUTE the sound. The input device 28 is also connected to the CPU 21. The signal receiving device 1 also comprises an output device 29 which, in the preferred embodiment, is a display device which provides a visual indication of the state of operation of the signal receiving device 1. The output device 29 is also connected to the CPU 21.

The signal receiving device 1 also comprises a polling signal receiver 30 which is connected to the CPU 21 and which receives signals which are transmitted to the signal receiving device 1 from the central processing computer 4.

The signal receiving device 1 also comprises a polling signal transmitter 32 which is connected to the CPU 21 and which transmits data and/or information from the signal receiving device 1 to the central processing computer 4. As will be described in more detail hereinbelow, the data and/or information which is transmitted from the signal receiving device 1 is the data and/or information reflects viewer behavior.

The signal receiving device 1 also comprises a remote control receiver 32 which receives signals which are transmitted to the signal receiving device 1 from the remote control device 2. The remote control receiver 32 is also connected to the CPU 21.

The signal receiving device 1 also comprises a plurality of monitoring devices 33A to 33D which serve to monitor various operational states of the signal receiving device 1. These monitoring devices comprise an ON/OFF monitoring device 33A, which monitors the ON/OFF state of the signal receiving device 1 and generates a digital signal representative of this operational state; a CHANNEL monitoring device 33B, which monitors the television or broadcast channel or frequency being viewed by the television viewer and which generates a digital signal representative of the channel being viewed; a MUTE or UNMUTE monitoring device 33C, which monitors the occurrence of a MUTE or UNMUTE operational state and which generates a digital signal representative of a MUTE or UNMUTE state; and a VOLUME CHANGE monitoring device 33D which will monitor decreases and increases in volume and volume level. Each of the above described monitoring devices are connected to the CPU 21.

The signal receiving device 1 also comprises a real-time event clock 34 for maintaining accurate real-time event time keeping and time measurements. The event clock 34 is connected to the CPU 21. The signal receiving device 1 also comprises a data latching device 35 which is connected to the CPU 21 and to each of the ON/OFF monitoring device 33A, the CHANNEL monitoring device 33B, the MUTE/UNMUTE monitoring device 33C and the VOLUME CHANGE monitoring device 33D as well as the real-time event clock 34.

Monitoring devices may also be utilized for monitoring the utilization of functions such as "SELECT" and "DISPLAY" as well as other viewer selectable functions and events related to on-line, interactive and non-interactive services and products as well as recreational activities and games.

Upon the occurrence of a pre-specified event, such as the turning of the signal receiving device 1 on or off, the changing of a television channel, the changing of volume level and/or the MUTING and UNMUTING of sound, the data from each of the monitoring devices 33A to 33D, as well as the time measured by the real-time event clock 34, will be read by, and stored within, the data latching device 35 in order to provide a time-stamped operational state of the signal receiving device 1. Monitoring devices may be utilized for monitoring any and all of the available features and operations over which a viewer or user may have control.

The present invention may also be utilized in conjunction with universal remote control devices. In this regard, appropriate monitoring devices can be utilized to monitor any and all features and functions which may be activated, controlled and/or selected via the universal remote control device.

Figure 3:
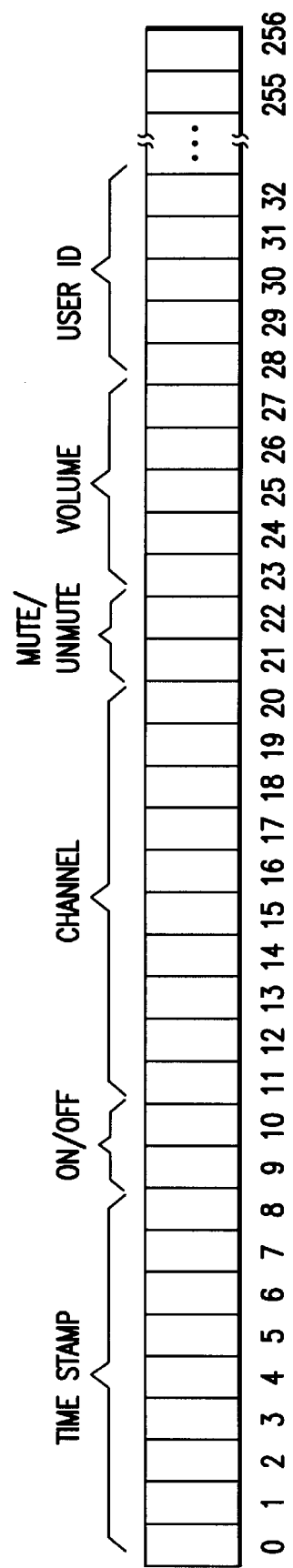
FIG. 3 illustrates a diagram of a preferred data structure containing the data obtained by the data latching device of FIG. 2.

FIG. 3 illustrates a preferred embodiment of a data structure which contains the data representative of the time-stamped data obtained from the monitoring devices 33A–33D. As illustrated in FIG. 3, the data structure consists of a 256-bit data stream in which bits 0–8 store the time stamp data, bits 9–10 store on/off data, bits 11–20 store channel data, bits 20–22 store MUTE/UNMUTE data, bits 23–27 store volume data and bits 28–31 store user identification data. The remaining bits 32–256 may be utilized to store other appropriate data as specified by the requirements of the system. The volume data will include data indicative of a volume decrease, a volume increase and the volume level. Bits 32–256 may be utilized to store data related to system maintenance functions, clock functions, video recording functions as well as other functions, services and products along with features ancillary thereto.

In the preferred embodiment of the present invention, the states of each of the monitoring devices 33A–33D are continuously monitored with their respective states represented in a digital signal fashion. When a change of operational state occurs, whether by viewer activation of the input device 28 or the remote control device 2, the CPU 21 will activate the data latching device 35. The data latching device 35 will read the signals present at each of the monitoring devices 33A–33D, as well as the time from the real-time event clock 34, so as to obtain a time-stamped digital signal representative of the post-event operational state of signal receiving device 1.

It is important to note that additional monitoring devices may be utilized to monitor various other functions and/or features related to television viewing and/or use. Further, monitoring devices may be utilized to monitor the usage and/or control of any and all features and/or functions which are provided on or by a remote control device or universal remote control device.

The signal receiving device 1 also comprises a memory storage device or database 36 for storing raw data and/or information, as well as other data and/or information, which is received by the data latching device 35. In this regard, the time-stamped data described herein, as well as any other data relevant to system operation, is stored in the database 36.

As noted above, a central processing computer 4 is utilized, which collects data from any number of signal receiving devices, at a centralized location. The central processing computer 4 collects and processes the data and/or information in conjunction with program and advertising commercial content and correlated time data.

Figure 4:
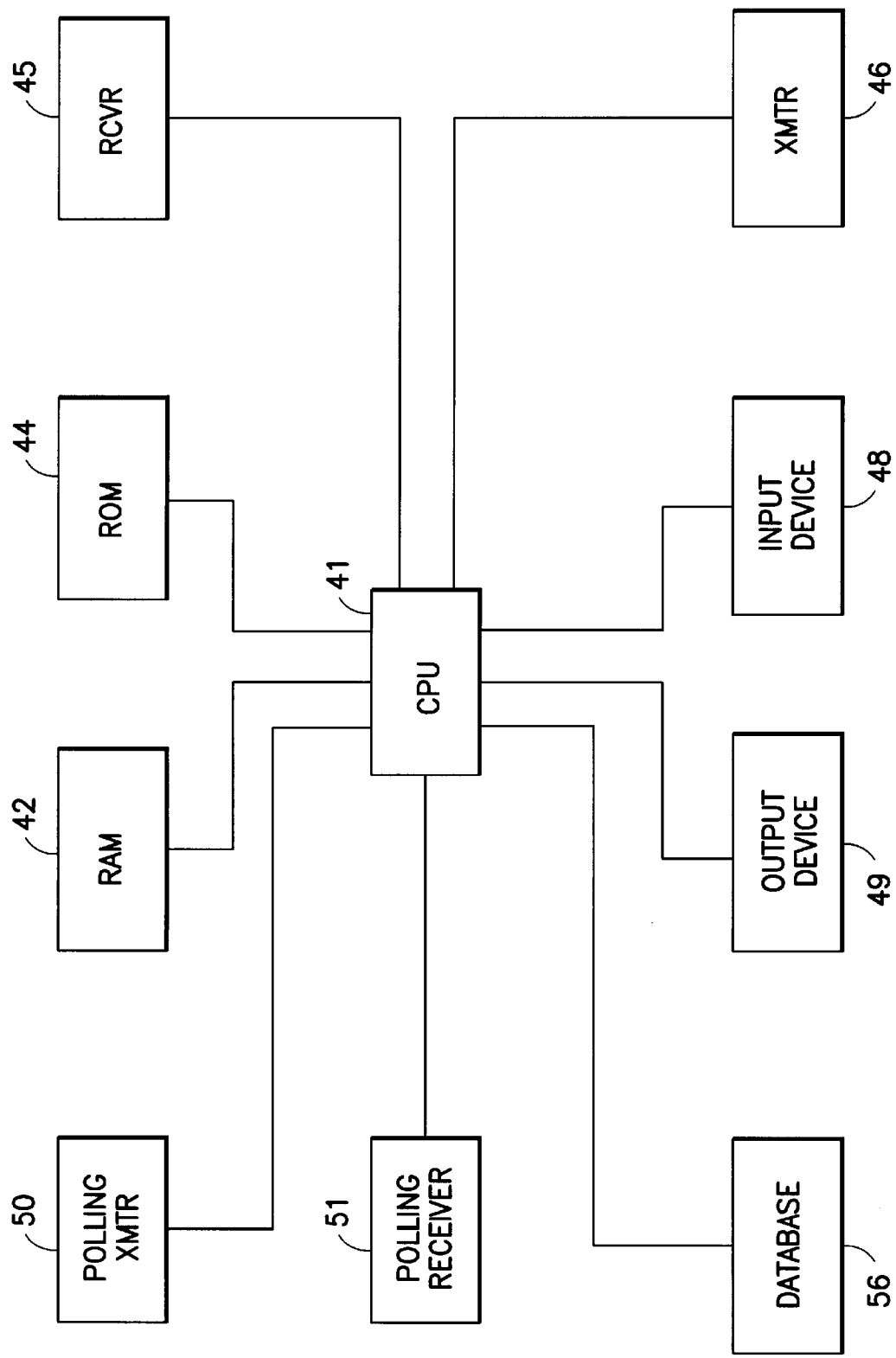
FIG. 4 illustrates the central processing computer of FIG. 1 in block diagram form.

FIG. 4 illustrates the central processing computer 4 of FIG. 1 in block diagram form. In FIG. 4, the central processing computer 4 comprises a central processing unit (CPU) 41 which serves to provide control over the central processing computer 4. The central processing computer 4 also comprises a random access memory (RAM) device 42 and a read only memory (ROM) device 44 which are connected to the CPU 41. The central processing computer 4 also comprises a receiver 45, for receiving signals, containing data and/or information, from the signal receiving device 1, and a transmitter 46, for transmitting signals to the signal receiving device 1. The receiver 45 and the transmitter 46 are connected to the CPU 41. As will be described in more detail hereinbelow, the data and/or information which is received from the signal receiving device 1 will include the aforementioned time-stamped data indicative of and/or reflecting the operational state of the signal receiving device 1.

The central processing computer 4 also comprises an input device 48, for enabling a user to enter data and/or commands into the central processing computer 4. The input device 48 is also connected to the CPU 41. The central processing computer 4 also comprises an output device 49 which, in the preferred embodiment, is a display device which provides a visual indication of the state of operation of the central processing computer 4. The output device 49 is also connected to the CPU 41.

The central processing computer 4 also comprises a polling signal transmitter 50 which is connected to the CPU 41 and which transmits polling signals to the signal receiving device 1 and, in particular, to the polling signal receiver 30. The central processing computer 4 also comprises a polling signal receiver 51 which is connected to the CPU 41 and which receives polling signals from the signal receiving device 1 and, in particular, from the polling signal transmitter 31.

The central processing computer 4 also comprises a memory storage device or database 56 for storing data and/or information which is received from the signal receiving device 1. The database 56, in the preferred embodiment, will contain information regarding the demographics of the viewer, subscriber, or customer base, as well as other data and/or information, which data and/or information may be compiled with viewer, subscriber, or customer consent or permission.

The system and method of the present invention serves to monitor television viewer behavior and/or patterns by recording data and/or information which is reflects viewer events, which include on/off operation of the signal receiving device 1, the changing of channels, the muting or unmuting of volume, the changing of volume, as well as any other event-defined activities which may occur at the viewer's direction. The data and/or information, which is initially stored in the signal receiver device 1, is transmitted, at various times, to the central processing computer 4. The central processing computer 4 may then process the data and/or information, in any one of a number of ways in order to obtain statistical and/or other information which may be utilized in order to describe or gauge viewer behavior. This data and/or information may also provide statistical information for a large group of viewers.

Figure 5A:
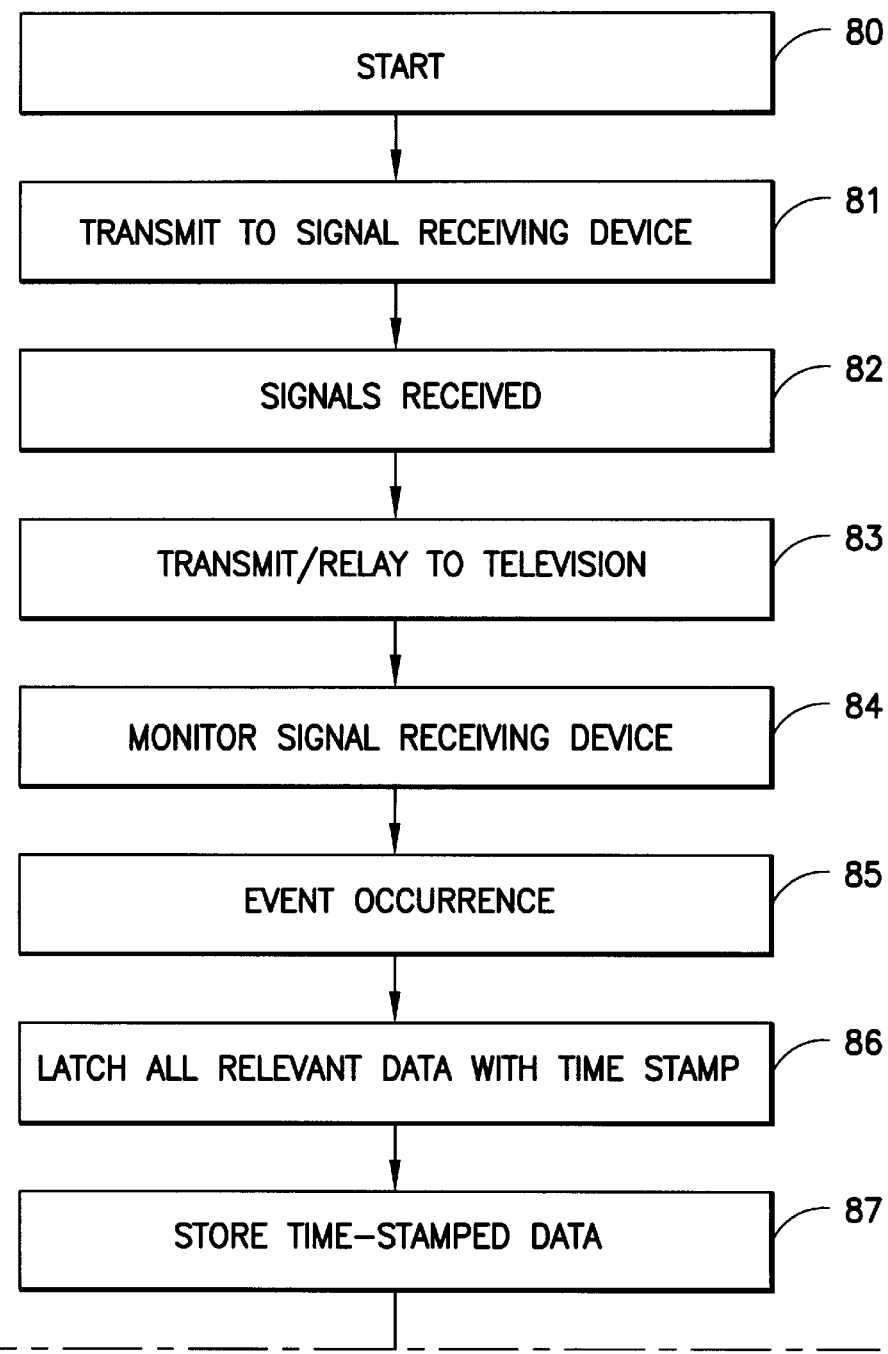
FIG. 5 illustrates a flow chart which illustrates the operational steps and method of utilizing the system of the present invention.
Figure 5B:
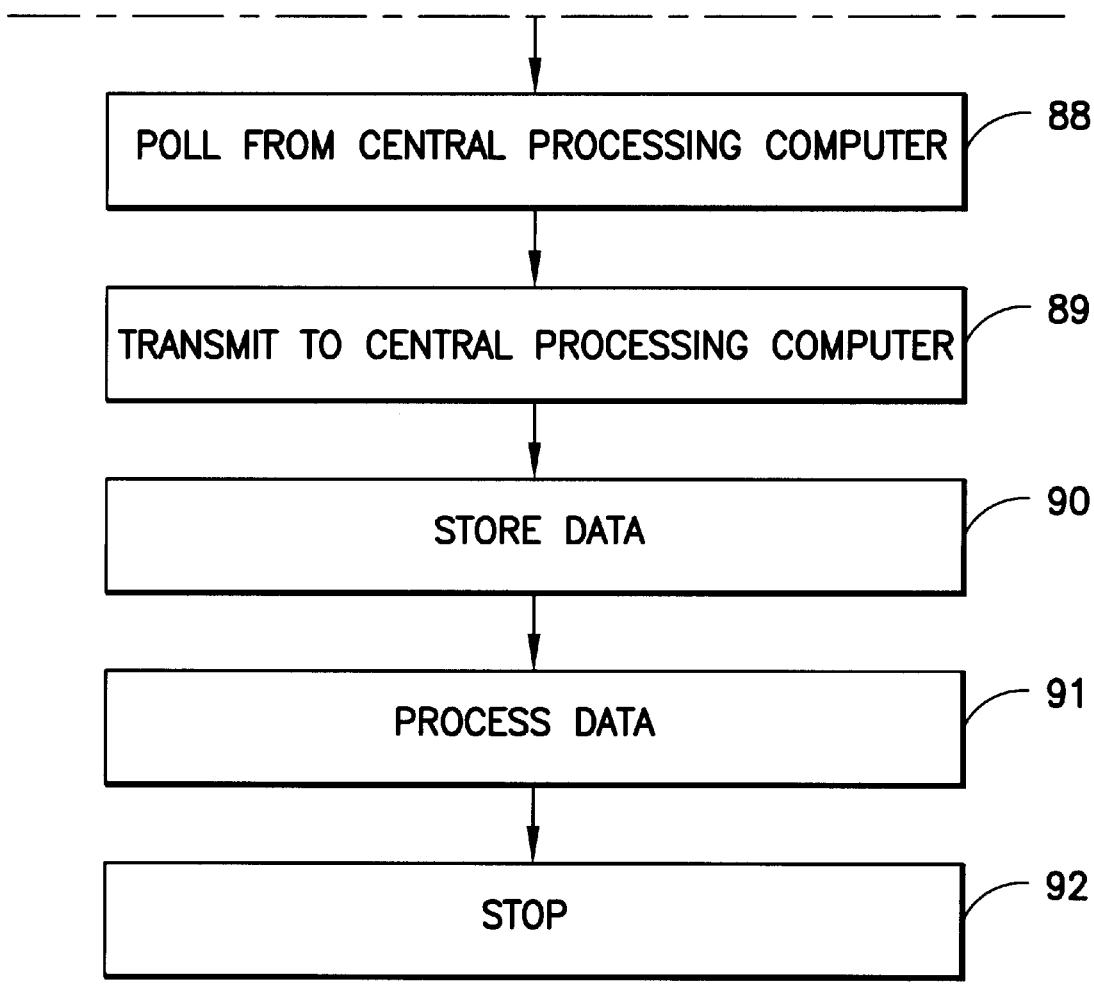

The system of the present invention is utilized in the following manner. FIG. 5 illustrates a flow chart of the operation of the system and method of the present invention. Operation of the system commences at step 80. At step 81, the television signals are broadcast to the viewer's signal receiving device 1. The television signals are broadcast via hard-wire cable transmission systems, by satellite or wireless transmission systems, and/or by any combination of both. The signal receiving device 1 receives the television signals at step 82. The television signals may be scrambled or unscrambled depending upon the signals and/or the signal receiving device 1 of the viewer. This unscrambling operation, if required, will also take place during step 82.

In the case of scrambled signals, appropriate interfaces must be employed in conjunction with the signal receiving device 1 in order to perform the necessary de-scrambling functions. In the case of cable television systems, the signals are transmitted via the cable system to the signal receiving device 1. In the case of satellite systems, the signals are transmitted to a receiver, such as a satellite dish, and, thereafter, transmitted to the signal receiving device 1. The television signals are then transmitted or relayed to the viewer's television at step 83 via the cables utilized in conjunction therewith. The television signal corresponding to the channel selected is then viewable on the television.

As described above, the monitoring devices 33A to 33D serve to continuously monitor the real-time operational states of the on/off switch, the channel being viewed, the MUTE/UNMUTE function and the volume setting, of the signal receiving device 1, respectively, at step 84 and throughout system operation. The digital signal representations of these real-time operational states is continuously available at, and from, the monitoring devices 33A–33D. Further, the real-time event clock 34 keeps time continuously during system operation.

The data and/or information which represents the operational states of the signal receiving device 1, will represent the post-event state of same. As noted above, the pre-defined event is any action taken by the viewer to turn the signal receiving device 1 on or off, to change a channel, to MUTE or UNMUTE sound and to decrease or increase the volume, via either the remote control unit 2 or the input device 28.

Upon the occurrence of the pre-defined event, at step 85, such as when the viewer turns the signal receiving device 1 on or off, effects a channel change, MUTES or UNMUTES the sound and/or decreases or increases the volume, the post-event states of the monitoring devices 33A–33D will be determined, and latched, along with the time-stamp data from the event clock 34, at step 86, by the data latching device 35. Thereafter, at step 87, the latched data will be stored in the database 36.

The above sequence of events, defined by steps 85 to 87, may be repeated with the results corresponding thereto being latched and stored as described above. In this manner, the system 100 will monitor and record television viewing behavior which is indicative of and/or reflects the viewing behavior or usage of the viewing audience or user group.

The above-described data will continue to be stored in database 36 until such time as the central processing computer 4 polls the signal receiving device 1 in order to initiate a data transmission or upload of the data and/or information.

At step 88, the central processing computer 4 will transmit a polling signal from the polling signal transmitter 50 to the polling signal receiver 30 of the signal receiving device 1. The CPU 21 of the signal receiving device 1, upon processing the received polling signal will, at step 90, download the data and/or information which is stored in the database 36 by transmitting same, via the polling signal transmitter 31, to the polling signal receiver 51 of the central processing computer 4. Thereafter, the data and/or information will be stored in the database 56 of the central processing computer 4, at step 90. In the preferred embodiment, the polling signal is transmitted periodically, from the central processing computer 4, to the signal receiving device 1 in order to periodically upload the stored data and/or information. The data and/or information obtained from these polling/uploading routines is then stored in the database 56 of the central processing computer 4 for later processing and analysis.

The data and/or information obtained from the signal receiving device 1, for any viewer or number of viewers, is then available for processing, at step 91. Thereafter, the operation of the system will cease at step 92. The above procedure can be repeated for any number of viewers/signal receiving devices which may be located in homes and/or at other viewer locations.

The data and/or information, which is stored in the database 56, may be processed in any appropriate manner in order to obtain desired data and/or information. The processed data and/or information will contain data and/or information indicative of and/or reflecting viewer behavior and/or viewer responses to various programming and advertising subject matter.

The processed data and/or information may be processed and updated, in conjunction with detailed information and/or listings corresponding to programming and advertising commercials, which may preferably include data including the information content and along with corresponding timing information. For example, compiled data and/or information which correlates the program and/or advertizing commercial content with corresponding timing information, may be utilized to correlate the viewer or user event activity with the information related to the program or advertizing commercial being viewed at the time of the event occurrence. In this regard, viewer or user behavior, in response to program or advertizing commercial content, may be ascertained via the present invention.

In a preferred embodiment, data processing routines may be repeated every 5–10 seconds so as to provide continuous data updates. Analytic screens may also be employed so as to maintain the integrity of the data and/or information obtained by the system of the present invention.

The data and/or information obtained from the present invention may be utilized in order to provide viewer behavior information which may provide analysis across demographic and geographic groupings. The obtained results may facilitate the assessment of the effectiveness of program and advertising commercials which, thereafter, may be made available to advertisers as well as to prospective advertisers.

The signal receiving devices 1, in the preferred embodiment, may be addressable devices which may be selectively and individually polled. The signal receiving devices may also be polled by, and be required to return a return authorization signal to, the central processing computer 4. In this manner, only authorized signal receiving devices 1 may be utilized with the system of the present invention.

The signal receiving device 1, described in the preferred embodiment of FIG. 1, is an integral unit within a cable television signal receiver or "cable box". In alternate embodiments, the signal receiving device 1 may be an integral unit of a television, a VCR or such other devices capable of receiving television signals.

While the present invention has been described and illustrated in various preferred and alternate embodiments, such descriptions and illustrations are not to be construed to be limitations thereof. Accordingly, the present invention encompasses any variations, modifications and/or alternate embodiments with the scope of the present invention being limited only by the claims which follow.

What is claimed is:

1. A system for uninterrupted and passive continuous monitoring and measuring viewer behavior of a plurality of television viewers and pattern data among viewer events and tuning alternatives in a plurality of viewing premises to provide information for direct correlation with concurrent detailed data of programming and broadcasting in order to analyze and ascertain the responses of the plurality of viewers to program and advertising content for the purpose of assessing the effectiveness of said programming and advertising content, wherein the results of said analysis can be made available to advertisers, said system comprising:

a plurality of signal receiving devices located in a plurality of viewing premises, wherein each said signal receiving device further comprises:

a viewer event and tuning alternative decision device, for uninterrupted and passive continuous monitoring, categorizing and storing the television viewer behavior and pattern data among viewer events and tuning alternatives on the continuous basis;

an event timing device for recording a realtime record of event from/to time occurrence and for generating a digital signal representative of event from/to time occurrence;

a data latching device for one of uninterrupted continuous latching and storing the digital signals for real-time timing data generated by said viewer event and tuning alternative decision device and said event timing device; and a database for storing the data one of latched and stored by said data latching device.

2. The system of claim 1, which further comprises:

a control device for controlling said signal receiving device;

a television signal receiver for receiving television signals; and a device for one of transmitting and relaying the received television signals to a television.

3. The system of claim 1, wherein said signal receiving device further comprises:

a viewer input device for facilitating viewer control over said signal receiving device; and an output device for providing an indication of signal receiving device operation.

4. The system of claim 1, which further comprises:

a central processing computer which is located remotely from said signal receiving device, which further comprises:

a control device for controlling the operation of said central processing computer;

a receiver for receiving data obtained at said signal receiving device;

a memory storage device for storing data obtained from said signal receiving device, and means for processing said data obtained from said plurality of signal receiving devices and for generating output data that is indicative of and reflects viewer behavior and pattern data among viewer events and tuning alternatives on the timing basis.

5. The system of claim 4, wherein said signal receiving device further comprises:

a receiver for receiving signals from said central processing computer; and a transmitter for transmitting data to said central processing computer.

6. The system of claim 5, wherein said central processing computer further comprises:

a transmitter for transmitting one of control, data and polling signals to said signal receiving device.

7. The system of claim 1, wherein television signals are transmitted via at least one of a television communication system, a telephone communication system, a wireless communication system and a fiber optic communication system.

8. The system of claim 1, wherein said viewer event and tuning alternative decision device comprises at least one of:

a television on/off unit;

a channel change unit;

a volume change unit;

a mute/unmute unit;

a data unit for selecting on-line activity; and one of: a viewer interactive and a viewer non-interactive event status data unit.

9. The system of claim 1, wherein said system further comprises:
a remote control device for remotely transmitting control signals to said signal receiving device; and
a remote control receiver for receiving said control signals at the signal receiving device.

10. The system of claim 4, further comprising:
a polling signal transmitter connected to said processing means;
a polling signal receiver connected to said processing means;
wherein said signal receiving device further comprises:
a receiver for receiving non-television signals from said polling signal transmitter; and
a transmitter for transmitting non-television signals to said polling signal receiver.

11. The system of claim 1, wherein said database comprises time-stamped data representative of at least one of: on/off timing data of the signal receiving device, channel change data, volume change data, mute/unmute timing data, and interactive and non-interactive event status data and interactive and non-interactive operation data.

12. A system for uninterrupted and passive continuous measuring viewer behavior of a plurality of television viewers and pattern data among viewer events and tuning alternatives in a plurality of viewing premises on an uninterrupted continuous real-time basis to provide information for direct correlation with concurrent detailed data of programming and broadcasting in order to analyze and ascertain the responses of the plurality of viewers to program and advertising content for the purpose of assessing the effectiveness of said programming and advertising content, wherein the results of said analysis can be made available to advertisers, said system comprising:
a plurality of signal receiving devices located in a plurality of viewing premises for receiving television signals from a transmitter, wherein said plurality of signal receiving devices at least one of:
uninterruptedly and continuously categorizes and stores the television viewer behavior and pattern data among the viewer event and tuning alternatives on the uninterrupted continuous timing basis in exercising control over a respective signal receiving device; and
a central processing computer located remotely with respect to each of said signal receiving devices for processing data obtained from said plurality of signal receiving devices to generate output data that is indicative of and reflects viewer behavior in direct correlation with concurrent detailed data of programming and broadcasting.

13. The system of claim 12, wherein each one of said plurality of signal receiving devices comprises:
a viewer event and tuning alternative decision device, for categorizing and storing the television viewer behavior and pattern data among viewer events and tuning alternatives on the uninterrupted continuous timing basis, wherein said viewer event and tuning alternative decision device generates a digital signal representative of timing data of at least one of: on/off data of the signal receiving device, channel change data, volume change data, mute/unmute data, on-line activity data and a user for one of: interactive and non-interactive event status data and interactive and non-interactive operation data;
an event timing device for keeping a real-time record of event time occurrence and for generating a digital signal representative of event time occurrence;
a data latching device for one of latching and storing the digital signals generated by said viewer event and tuning alternative decision device and said event timing device; and
a database for storing the data one of latched and stored by said data latching device to provide information for direct correlation with concurrent detailed data of programming and broadcasting.

14. The system of claim 12, wherein each of said plurality of signal receiving devices further comprise:
a control device for controlling each of said plurality of signal receiving devices;
a television signal receiver for receiving television signals; and
a device for one of transmitting and relaying the received television signals to a television.

15. The system of claim 12, wherein said central processing computer further comprises:
a control device for controlling the operation of said central processing computer;
a receiver for receiving data from said plurality of signal receiving devices;
a memory storage device for storing data obtained from said plurality of signal receiving devices; and
means for processing said data obtained from said plurality of signal receiving devices and for generating output data that is one of: indicative of and reflecting viewer behavior and pattern data among viewer events and tuning alternatives on the uninterrupted continuous timing basis.

16. The system of claim 12, wherein said central processing computer further comprises:
a transmitter for transmitting one of control, data and polling signals to said plurality of signal receiving devices.

17. The system of claim 12, wherein television signals are transmitted via at least one of a television communication system, a telephone communication system, a wireless communication system and a fiber optic communication system.

18. The system of claim 12, wherein at least one of said plurality of signal receiving devices comprises at least one of:
a television on/off from/to timing data unit;
a channel change data unit;
a volume change data unit;
a mute/unmute timing data unit;
a data unit for monitoring on-line activity and
one of: a viewer interactive and a viewer non-interactive event status data unit.

19. The system of claim 15, wherein said memory storage device comprises data regarding at least one of viewer and demographic information.

20. A method for uninterrupted and passive continuous measuring viewer behavior of a plurality of television viewers and pattern data among viewer events and tuning alternatives obtained from a plurality of viewing premises to provide information for direct correlation with concurrent detailed data of programming and broadcasting in order to analyze and ascertain the responses of the plurality of viewers to program and advertising content for the purpose of assessing the effectiveness of said programming and advertising content, wherein the results of said analysis can be made available to advertisers, said method comprising the steps of:
obtaining viewer event/tuning alternative decisions from a plurality of viewing premises on a passive and uninterrupted continuous basis, and categorizing and storing the television viewer behavior and pattern data for viewer events and tuning alternatives on the passive and uninterrupted continuous basis comprising at least one of: on/off data of a signal receiving device, channel change data, volume change data, mute/unmute data, on-line activity data and a user for one of: interactive and non-interactive event status data and interactive and non-interactive operation data;

generating a first digital signal representative of timing data of at least one of: on/off data of the signal receiving device, channel change data, volume change data, mute/unmute data, on-line activity data and a user for one of: interactive and non-interactive event status data and operation data; and generating a second digital signal representative of the time of occurrence of said timing data of at least one of: on/off data of the signal receiving device, channel change data, volume change data, mute/unmute data, on-line activity data and a user for one of: interactive and non-interactive event status data and interactive and non-interactive operation data; and time-stamping said first digital signal with said second digital signal to generate a third digital signal; and storing said third digital signal to provide information for direct correlation with concurrent detailed data of programming and broadcasting.

21. The method of claim 20, further comprising the step of:

transmitting said third digital signal to a central processing computer located remote with respect to where said third digital signal was generated.

22. The method of claim 20, further comprising steps of:

processing said third digital signal data; and generating an output data set representative of measuring television viewer behavior and pattern data for viewer events and tuning alternatives on the passive and uninterrupted continuous basis in direct correlation with concurrent detailed data of programming and broadcasting.

23. The method of claim 20, further comprising steps of:

obtaining third digital signal data for a plurality of viewers;

processing said third digital signal data; and generating an output data set representative of measuring television viewer behavior and pattern data for viewer events and tuning alternatives on the passive and uninterrupted continuous basis in direct correlation with concurrent detailed data of programming and broadcasting.

24. The method of claim 20, which further comprises the step of:

determining if a viewer is an authorized viewer.

25. The system of claim 1 wherein the tuning alternatives include channel selection, mute/unmute, volume increase/decrease, on-line access non-interactive options and interactive options.

26. The system of claim 1, wherein the analysis is performed across demographic and geographic groupings.

27. The system of claim 12, wherein the analysis is performed across demographic and geographic groupings.

28. The method of claim 20, wherein the analysis is performed across demographic and geographic groupings.

* * * * *